(12) United States Patent
Yuan

(10) Patent No.: US 11,792,351 B2
(45) Date of Patent: Oct. 17, 2023

(54) IMAGE PROCESSING METHOD, ELECTRONIC DEVICE, AND COMPUTER-READABLE STORAGE MEDIUM

(71) Applicant: VIVO MOBILE COMMUNICATION CO., LTD., Guangdong (CN)

(72) Inventor: Jianwei Yuan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/868,633

(22) Filed: Jul. 19, 2022

(65) Prior Publication Data

US 2022/0353436 A1 Nov. 3, 2022

Related U.S. Application Data

(63) Continuation of application No. PCT/CN2021/072921, filed on Jan. 20, 2021.

(30) Foreign Application Priority Data

Jan. 22, 2020 (CN) .......................... 202010075815.1

(51) Int. Cl.
  *H04N 5/262* (2006.01)
  *H04N 5/265* (2006.01)
  (Continued)

(52) U.S. Cl.
  CPC .......... *H04N 5/2628* (2013.01); *H04N 5/265* (2013.01); *H04N 23/62* (2023.01); *H04N 23/67* (2023.01)

(58) Field of Classification Search
  CPC ...... H04N 5/2628; H04N 5/265; H04N 23/62; H04N 23/67; H04N 23/632; H04N 23/676; H04N 23/958; H04N 23/951
  See application file for complete search history.

(56) References Cited

U.S. PATENT DOCUMENTS 11,146,723 B2 * 10/2021 Emmerich ............. H04N 23/13
2010/0128145 A1 5/2010 Pitts et al.
(Continued)

FOREIGN PATENT DOCUMENTS

CN 104520745 A 4/2015
CN 105959534 A 9/2016
(Continued)

OTHER PUBLICATIONS

International Search Report and Written Opinion of the International Searching Authority dated Mar. 31, 2021 as received in Application No. PCT/CN2021/072921.
(Continued)

*Primary Examiner* — Padma Haliyur
(74) *Attorney, Agent, or Firm* — Maschoff Brennan

(57) ABSTRACT

An image processing method, an electronic device, and a computer-readable storage medium are provided. The method includes: obtaining N images; determining a reference image in the N images; where the reference image is an image in which a target tilt-shift object has a sharpness greater than a preset threshold; obtaining tilt-shift parameters input by a user, where the tilt-shift parameters are used to indicate an azimuth of a target focal plane and a tilt-shift area range; determining, based on the tilt-shift parameters, to-be-composited image(s) in intersection with the target focal plane; and performing, based on focal lengths of the to-be-composited image(s) and the reference image, image composite on the N images to output a target tilt-shift image.

20 Claims, 5 Drawing Sheets

(51) Int. Cl.
*H04N 23/62* (2023.01)
*H04N 23/67* (2023.01)

(56) References Cited

U.S. PATENT DOCUMENTS

| | | | | |
|---|---|---|---|---|
| 2011/0193980 | A1* | 8/2011 | Ogasawara | H04N 1/387 348/222.1 |
| 2014/0226039 | A1 | 8/2014 | Yamamoto et al. | |
| 2014/0293004 | A1 | 10/2014 | Tsubaki | |
| 2015/0138383 | A1* | 5/2015 | Kelley | H04N 23/81 348/241 |
| 2015/0156478 | A1 | 6/2015 | Ono | |
| 2015/0288870 | A1* | 10/2015 | Nagaraja | H04N 23/676 348/333.02 |
| 2015/0325023 | A1* | 11/2015 | Gross | G06T 11/60 382/203 |
| 2016/0117829 | A1* | 4/2016 | Yoon | G06T 7/50 348/222.1 |
| 2019/0373202 | A1* | 12/2019 | Onuki | H04N 23/632 |
| 2021/0029291 | A1* | 1/2021 | Kondo | H04N 23/676 |
| 2021/0218902 | A1* | 7/2021 | Turcotte | H04N 23/67 |
| 2022/0274299 | A1* | 9/2022 | Cohen | B29C 45/1671 |

FOREIGN PATENT DOCUMENTS

| | | |
|---|---|---|
| CN | 107277363 A | 10/2017 |
| CN | 111246106 A | 6/2020 |
| JP | 5997645 B2 | 9/2016 |
| WO | 2013/153252 A1 | 10/2013 |

OTHER PUBLICATIONS

IN Patent Examination Report dated Oct. 19, 2022 as received in Application No. 202227041019.
Extended European Search Report dated Feb. 23, 2023 as received in application No. 21743879.5.
Alain et al., "Interactive Light Field Tilt-Shift Refocus With Generalized Shift-And-Sum" Oct. 10, 2019.

* cited by examiner

IMAGE PROCESSING METHOD, ELECTRONIC DEVICE, AND COMPUTER-READABLE STORAGE MEDIUM

CROSS-REFERENCE TO RELATED APPLICATIONS

This disclosure is continuation application of PCT International Application No. PCT/CN2021/072921 filed on Jan. 20, 2021, which claims priority to Chinese Patent Application No. 202010075815.1, filed with the China National Intellectual Property Administration on Jan. 22, 2020 and entitled "IMAGE PROCESSING METHOD, ELECTRONIC DEVICE, AND COMPUTER-READABLE STORAGE MEDIUM", which is incorporated herein by reference in its entirety.

TECHNICAL FIELD

The present invention relates to the field of image technologies, and in particular, to an image processing method, an electronic device, and a computer-readable storage medium.

BACKGROUND

Use of tilt-shift lenses to create tilt-shift photos with effects of miniature models is common in photography industry.

Due to size limitation of electronic devices such as mobile phones and tablet computers, it is difficult to install a large tilt-shift lens in electronic devices. In order to meet the needs of a user to take tilt-shift photos with electronic devices, methods of photo composite have been used to simulate tilt-shift effects. In photographing, by recording image field information of different photos, the different photos are composited based on the image field information to simulate tilt-shift effects.

However, it is difficult for the image field information recorded in the existing composite methods to reflect a distance relationship between photographed objects in real space, resulting in a miniature model effect not natural enough and a poor tilt-shift effect.

SUMMARY

According to a first aspect, an embodiment of the present invention provides an image processing method, applied to an electronic device, where the method includes:
  obtaining N images, where the N images are taken based on a same photographing location and have different in-focus subjects, and the different in-focus subjects correspond to different focal lengths;
  determining a reference image in the N images, where the reference image is an image in which a target tilt-shift object has a sharpness greater than a preset threshold;
  obtaining tilt-shift parameters input by a user, where the tilt-shift parameters are used to indicate an azimuth of a target focal plane and a tilt-shift area range;
  determining, based on the tilt-shift parameters, to-be-composited image(s) in intersection with the target focal plane; and
  performing, based on focal lengths of the to-be-composited image(s) and the reference image, image composite on the N images to output a target tilt-shift image.

According to a second aspect, an embodiment of the present invention provides an electronic device, where the electronic device includes:
  an image obtaining module, configured to obtain N images, where the N images are formed based on a same photographing location and have different in-focus subjects, and the different in-focus subjects correspond to different focal lengths;
  a reference image determining module, configured to determine a reference image in the N images, where the reference image is an image in which a target tilt-shift object has a sharpness greater than a preset threshold;
  a tilt-shift parameter receiving module, configured to obtain tilt-shift parameters input by a user, where the tilt-shift parameters are used to indicate an azimuth of a target focal plane and a tilt-shift area range;
  a to-be-composited image determining module, configured to determine, based on the tilt-shift parameters, to-be-composited image(s) in intersection with the target focal plane; and
  a composite processing module, configured to perform, based on focal lengths of the to-be-composited image (s) and the reference image, composite processing on the N images to output a target tilt-shift image.

According to a third aspect, an embodiment of the present invention provides an electronic device, including a processor, a memory, and a computer program stored in the memory and capable of running on the processor, where when the computer program is executed by the processor, the steps of the image processing method according to the first aspect are implemented.

According to a fourth aspect, an embodiment of the present invention provides a computer-readable storage medium, where the computer-readable storage medium stores a computer program, and when the computer program is executed by a processor, the steps of the image processing method according to the first aspect are implemented.

DETAILED DESCRIPTION

The following clearly describes the technical solutions in the embodiments of this invention with reference to the accompanying drawings in the embodiments of this invention. Apparently, the described embodiments are some but not all of the embodiments of this invention. All other embodiments obtained by a person of ordinary skill in the art based on the embodiments of this invention without creative efforts shall fall within the protection scope of this invention.

It should be understood that "one embodiment" or "an embodiment" mentioned throughout the specification means that specified features, structures, or characteristics related to the embodiment are included in at least one embodiment of the present invention. Therefore, "in one embodiment" or "in an embodiment" appearing throughout the specification does not necessarily refer to a same embodiment. In addition, these specified features, structures, or characteristics may be combined in one or more embodiments in any appropriate manner.

It should be understood that in the embodiments of the present invention, sequence numbers of the following processes do not mean execution sequences. The execution sequences of the processes should be determined based on functions and internal logic of the processes, but should not be construed as any limitation on implementation processes of the embodiments of the present invention.

Figure 1:
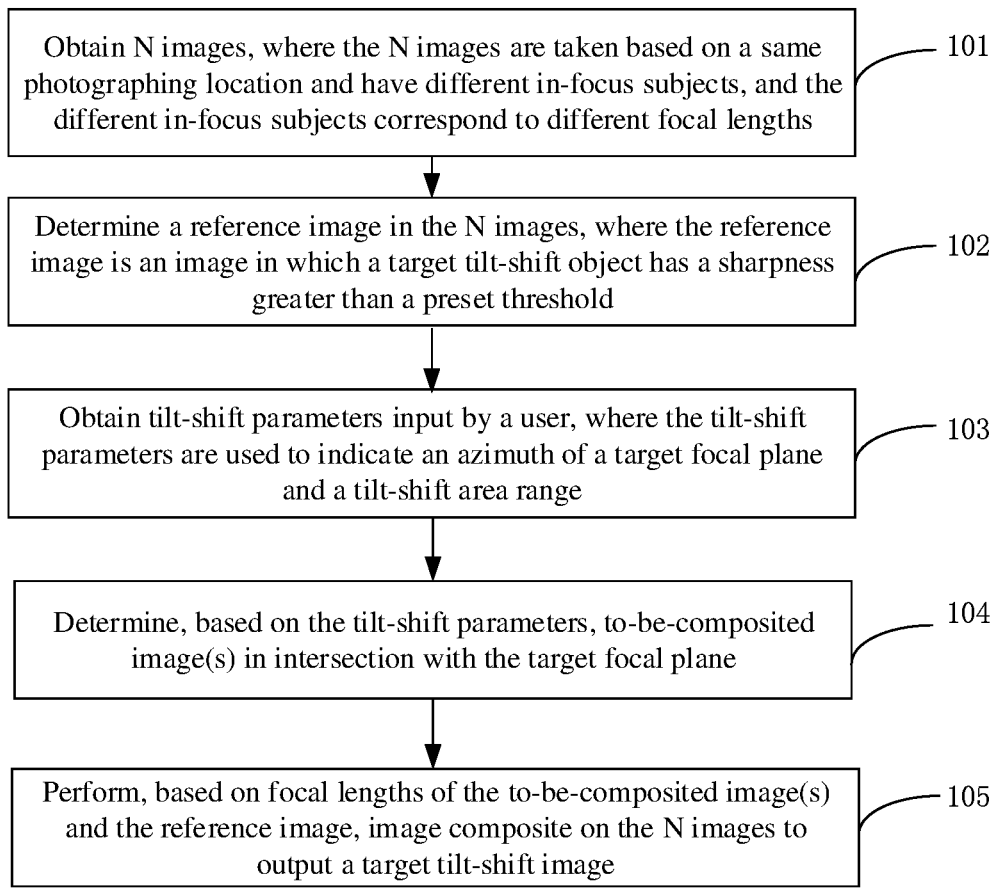
FIG. 1 is a flowchart of an image processing method according to an embodiment of the present invention.

FIG. 1 is a flowchart of an image processing method according to an embodiment of the present invention. The method includes the following steps.

Step 101. Obtain N images, where the N images are taken based on a same photographing location and have different in-focus subjects, and the different in-focus subjects correspond to different focal lengths. It is easy to understand that tilt-shifting can make up for a perspective distortion defect caused by a wide-angle lens, and achieve same visual effects as a miniature model by changing an optical axis. In the traditional camera field, in order to achieve a miniature model effect, a tilt-shift lens is used based on Scheimpflug principle, so that in a taken photo, some areas are sharp, and other areas are blurred. The sharp areas are contrasted with the blurred areas, giving viewers a visual experience of a miniature model.

In the embodiments of the present invention, to achieve this miniature model effect, N images may be obtained. The N images at least need to meet the following condition: the images need to be taken on a same photographing location and each has a different in-focus subject. If each of the N images is taken at a different location, picture contents of the images are different, so that subsequent alignment and composite cannot be performed on the images. It can be understood that to implement image composite, N is at least 2. To ensure photographing at the same location, the user can fix the device on a tripod to photograph, or hold the device in hand and use a photographing angle and a photographing azimuth prompted by a virtual level on a screen to keep the device stationary.

If an in-focus subject is different in each of the N images, subject objects that remain sharp in the different images are different. Because when a photo is taken, a location of a camera is fixed and photographed subjects in front of the camera are at different distances, focal lengths of the in-focus subjects can be recorded in original image coding data (commonly known as raw data) of this photo. The focal length is a distance between the camera and the in-focus subject. Specifically, the distance generally refers to a distance between an image sensor and the in-focus subject.

Figure 2:
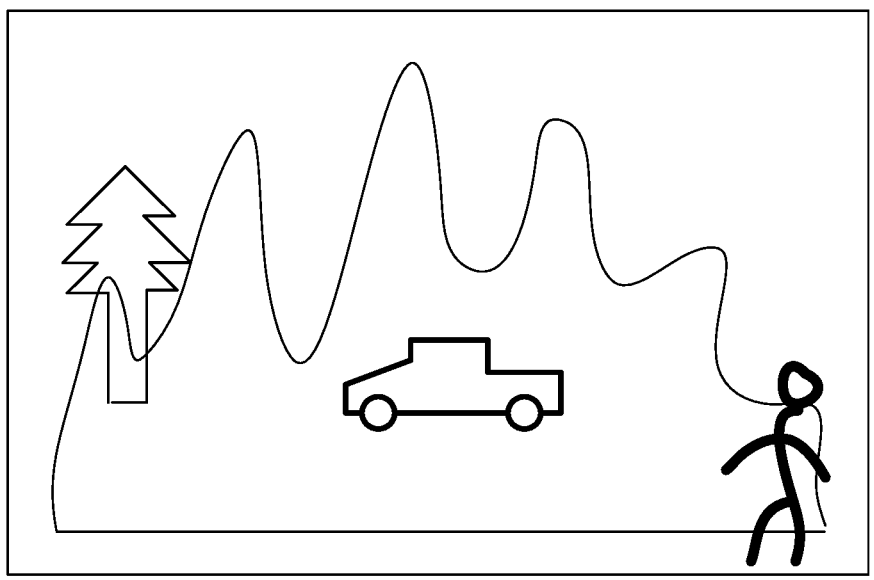
FIG. 2 is a schematic diagram of a viewing window for a viewfinder according to an embodiment of the present invention.
Figure 3:
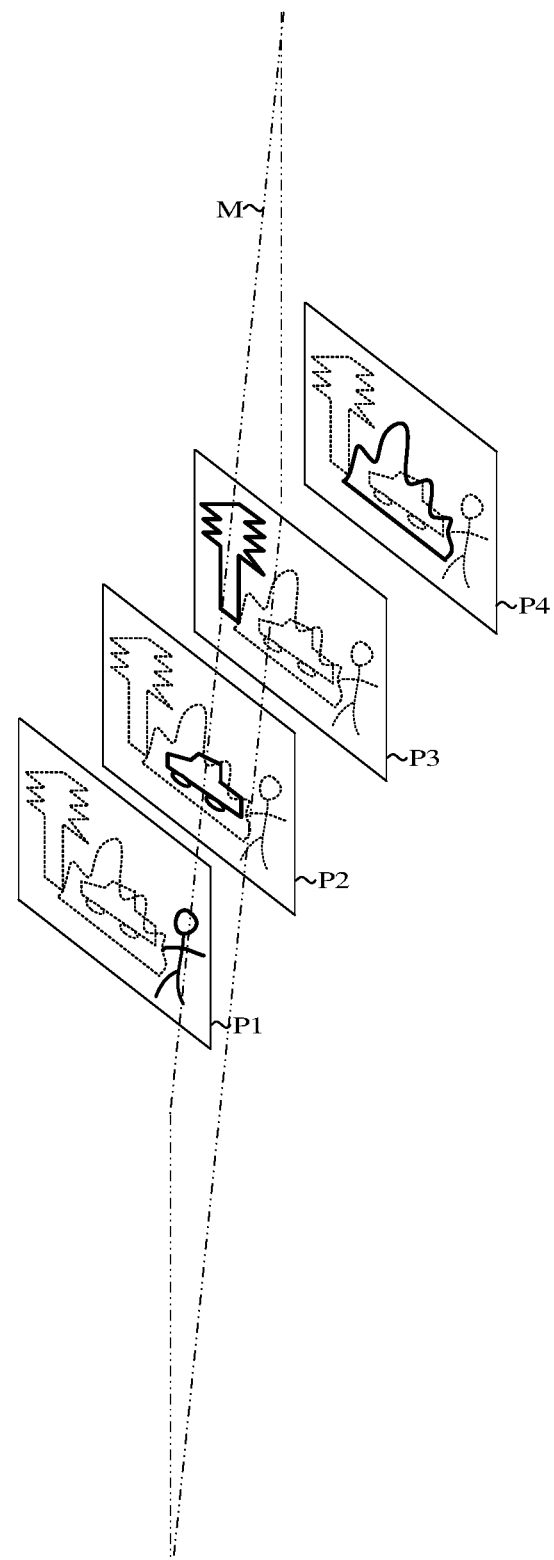
FIG. 3 is a schematic diagram of N images according to an embodiment of the present invention.

Taking a photographing scene described below in FIG. 2 as an example, through a viewfinder, a person, a car, a tree, and a mountain from near to far distributed in front of the camera can be observed. As shown in FIG. 3, when the person is selected as an in-focus subject for a focus point, the person in a captured image P1 is a sharp subject, and elements other than the person are blurred. When the car is selected as an in-focus subject for a focus point, the car in a captured image P2 is a sharp subject, and elements other than the car are blurred. When the tree is selected as an in-focus subject for a focus point, the tree in a captured image P3 is a sharp subject, and elements other than the tree are blurred. When the mountain is selected as an in-focus subject for a focus point, the mountain in a captured image P4 is a sharp subject, and elements other than the mountain are blurred. It is easy to understand that focal lengths of the in-focus subjects are recorded in the raws of the four images P1, P2, P3, and P4, respectively.

It can be understood that such N images may be taken by the user using another device, and transmitted from the another device to a device currently performing image processing through a memory card or wirelessly, or may be taken by the device currently performing image processing itself.

Specifically, the image obtaining in step 101 may be implemented by one of Method 1 or Method 2 below.

Method 1: Stored when an electronic device performs a photographing operation.

Sub-step 1. Perform a photographing operation on each of N different in-focus subjects to obtain N images.

When the user uses the electronic device to photograph, the electronic device is fixed at one location. By touching a viewfinder screen displayed in real time on a display, different photographing objects can be selected, that is, different in-focus subjects can be selected. After one in-focus subject is selected and a long-press operation by the user is received, the camera can also automatically lock a focus location, so as to avoid focus failure due to out-of-focus. For example, when the user chooses to focus on the car, the camera can briefly lock focus on the car; and when the user chooses to focus on the person, the camera can briefly lock focus on the person. After photographing operations are performed separately for different in-focus subjects, N photos with a same number of in-focus subjects are taken.

Sub-step 2. Store the N images. Details may include:

A. Determine a focal length of each of the N different in-focus subjects with respect to the camera.

Because the in-focus subjects in an actual scene are in a three-dimensional space, naturally a distance relationship exists among the in-focus subjects in front of the lens. Corresponding focal lengths between the in-focus subjects and the camera can be calculated by using a module of the camera such as a ultrasonic module, an infrared module, or a laser module, so that a distance parameter reference is provided for image composite.

B. Sort the N images in order of their focal lengths.

Because the in-focus subjects in the images are different, the focal lengths corresponding to the images are also not exactly the same and can be arranged in order or in reverse order based on an order of the focal lengths of the in-focus subjects in the N images. For example, in FIG. 5, the in-focus subject in the image P1 is the person that is closest to the camera, and the in-focus subject in the image P2 is the car that is next closest to the camera. The in-focus subject in the image P3 is the tree that is far from the camera. The in-focus subject in the image P4 is the mountain that is farthest from the camera. The N images are arranged based on an order the focal lengths, which helps reduce computational load of an image processor when searching for the to-be-composited images and save computing resources, and helps improve image processing efficiency.

C. Store the sorted N images.

The sorted N images can be stored in a memory in groups. To facilitate searching for the N images, specific identification character(s) can also be added to attribute information of the N images in storing the N images.

Method 2: Obtain from another electronic device.

Sub-step 1. Access a target device through a removable storage medium or wirelessly.

When implementing the image processing method provided in this application, in addition to processing the images taken by the current device in real time, it is also possible to access another target device, for example, another mobile phone, a computer, or a server, by means of a removable storage medium such as a memory card or a USB disk, or wirelessly by means of Bluetooth, Wi-Fi, and a mobile communication network.

Sub-step 2. Obtain N images prestored by the target device.

By reading the N images prestored in the memory of the target device, images in a device other than the current device can be processed to generate tilt-shift images. It can be understood that the N images in the target device in this case still need to meet the photographing requirements of the foregoing step 101.

Step 102. Determine a reference image in the N images, where the reference image is an image in which a target tilt-shift object has a sharpness greater than a preset threshold.

It should be noted that the miniature model effect is a visual effect that is created after the image has been processed, and that the decision as to which photographed object in an image is to be tilt-shifted depends on psychological needs of the user. That is to say, a reference image needs to be determined by an electronic device from the N images in accordance with processing requirements of the user, and the reference image is an image in which the target tilt-shift object has a sharpness greater than the preset threshold. In other words, based on the already obtained N images, a sharp area in each image is different. For example, as shown in FIG. 3, the person in the image P1 is sharp, the car in the image P2 is sharp, the tree in the image P3 is sharp, and the mountain in the image P4 is sharp. In this embodiment of the present invention, which area is sharp and which area is blurred may be determined according to magnitudes of contrast of different areas by performing contrast identification on areas of each image, and an image in which the target tilt-shift object on which the user wants to perform tilt-shift processing has a sharpness greater than the preset threshold is found from the N images and used as the reference image. The preset threshold can be preset by a technician. It can be understood that if there are a plurality of images, each having a sharpness greater than the preset threshold, correspondingly, a most sharp image can be selected from the plurality of images with different sharpness values. A picture presented on the reference image is that an area of the target tilt-shift object is clearly visible and an area outside the target tilt-shift object is blurred.

Specifically, the determination of the reference image in step 102 may be implemented by a method below.

Sub-step 1. Receive object location information of the target tilt-shift object input by the user, where the object location information includes a location area at which the target tilt-shift object is located in the N images.

In the foregoing N images, same picture elements are recorded in each image. For example, as shown in FIG. 3, each of the images P1 to P4 is a combination of a person, a car, a tree, and a mountain, and a difference lies in the in-focus subject. On the electronic device, the user is presented with a visual effect resulted from a plurality of stacking layers, each layer has an image, and the topmost layer is a transparent layer, which is used to receive input control information by the user. The input control information is object location information and may be one coordinate point or an area enclosed by several coordinate points. The object location information indicates a location area at which the target tilt-shift object is located in the N images. From this transparent layer, the user can see all the photographed objects, and determine a particular object as the target tilt-shift object according to a tilt-shift result need. For example, taking the car as the target tilt-shift object, the user touches a location corresponding to the car on a display, and the transparent layer can receive a point- or area-touch signal and know that the user has selected which photographed object as the target tilt-shift object.

Sub-step 2. Determine the reference image from the N images based on the object location information. Details may include:

A. Obtain a sharpness of each of the N images.

A raw image is raw data of digital signals that converted by an image sensor from captured light source signals. A raw file is a file that records original information from a camera sensor and some metadata (such as sensitivity, shutter speed, aperture value, and white balance) generated by the camera in photographing. The in-focus subject in each image is different, which is specifically embodied in the raw file as a difference in pixel information. By analyzing raw data, the sharpness of each of the N images can be obtained, and specifically, a sharpness difference between different areas of any image can be obtained.

B. Determine an image in which the target tilt-shift object has a sharpness greater than the preset threshold as the reference image.

Because the electronic device has received the object location information about the target tilt-shift object input by the user, more specifically, the electronic device has obtained information of a user-touch location. Based on the object location information, the electronic device can know a sharpness of the location, that is, a sharpness of the target tilt-shift object. The sharpness of the location in each image can be compared with the preset threshold to filter out an image with a sharpness greater than the preset threshold as the reference image. It can be understood that the preset threshold needs to be set according to empirical data during setting and that at least one reference image can be filtered out needs to be ensured.

Step 103. Obtain tilt-shift parameters input by a user, where the tilt-shift parameters are used to indicate an azimuth of a target focal plane and a tilt-shift area range.

After the reference image is selected, the electronic device receives an operation by the user on the reference image. For example, if the user wants to perform tilt-shift processing on the car in FIG. 4, the target tilt-shift object is the car and a corresponding reference image is determined as the image P2. The tilt-shift parameters input by the user on the reference image are obtained. With the tilt-shift parameters input by the user on an operation screen, the azimuth of the target focal plane and the tilt-shift area range may be determined. The target focal plane is a plane at which a tilt-shift axis formed by connecting the photographed objects is located, and the tilt-shift area is an area corresponding to the tilt-shift effect.

Specifically, the tilt-shift parameters may include a target tilt-shift point, a tilt-shift inclination, and a depth-of-field width. The target tilt-shift point is a coordinate location at which the target tilt-shift object is located. The target tilt-shift point input by the user on the reference image is a coordinate location at which the target tilt-shift object is located. It should be noted that the target tilt-shift point may be a coordinate point determined based on a user-touch signal, or may be an area enclosed by several coordinate points determined based on the user-touch signal. For example, when occupying a small proportion of pixels in an image picture, the target tilt-shift object may be a point (for example, a bird photographed by using a wide-angle lens), and when occupying a large proportion of pixels in the image picture, the target tilt-shift object may be an area (for example, a building photographed by using the wide-angle lens). The tilt-shift inclination is an included angle between the target focal plane at which the target tilt-shift point is located and an imaging plane of the reference image, and the target focal plane is a plane at which a tilt-shift axis formed by connecting photographed objects is located. The depth-of-field width is a width of an area with a tilt-shift effect.

For the obtaining of the tilt-shift parameters, an input box may be set on a touch screen so that the user can actively input the parameters, or a sliding bar or a virtual operation control reference line may be set on the touch screen so that the user can adjust the settings based on real-time visual feedback, to achieve an input purpose, and this embodiment of this application imposes no limitation thereon.

Step 104. Determine, based on the tilt-shift parameters, to-be-composited image(s) in intersection with the target focal plane.

After the electronic device obtains the foregoing tilt-shift parameters, a target focal plane that matches user needs can be constructed by using the tilt-shift parameters. Because the target focal plane is a combination of elements on each of the images, the target focal plane forms a virtual intersection with each of the images. However, not every image that intersects with the target focal plane may be used. Therefore, it is required to determine to-be-composited image(s) therefrom. It can be understood that in this embodiment of this application, the target focal plane intersects with each of the images, and therefore the target focal plane is always a virtual imaginary plane.

Specifically, when the tilt-shift parameters include the target tilt-shift point, the tilt-shift inclination, and the depth-of-field width, the determination of the to-be-composited image(s) in step 104 may be implemented by the following method.

Sub-step 1. Determine, based on the target tilt-shift point and the tilt-shift inclination, a tilt-shift azimuth of the target focal plane.

The tilt-shift azimuth of the target focal plane can be uniquely determined based on the received target tilt-shift point and tilt-shift inclination. In combination with illustrations of FIG. 4 and FIG. 5, it is required to determine an azimuth of the target focal plane. After a target tilt-shift point O is available, a location of a target focal plane M is determined, and in further combination with a tilt-shift inclination a, a direction of its deflection can be known. Therefore, the imaginary target focal plane M corresponding to a tilt-shift axis m can be found.

Figure 4:
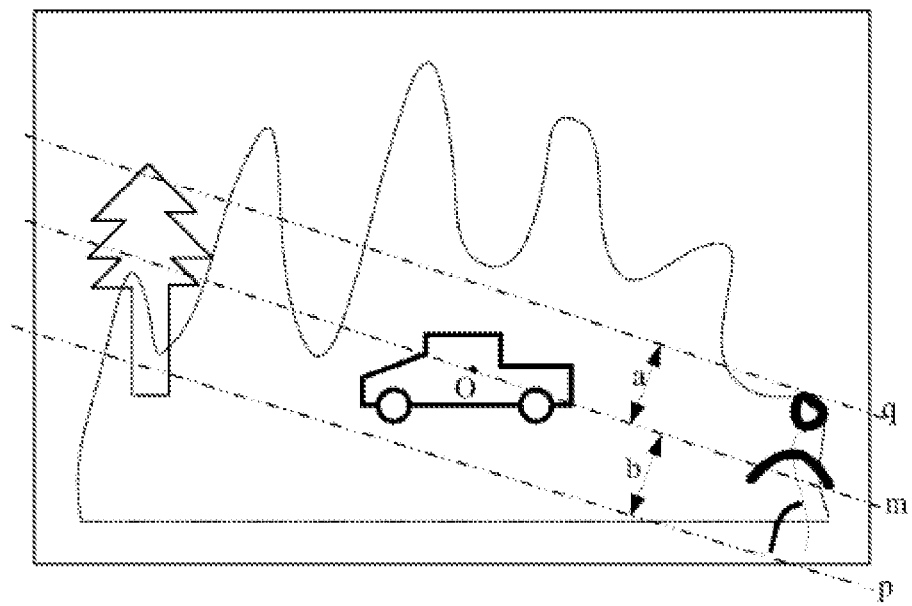
FIG. 4 is a schematic diagram of a tilt-shift image according to an embodiment of the present invention.

As illustrated in FIG. 4, after the user has touched to select the car as the target tilt-shift object, a virtual straight line m can be displayed on the display. The straight line m always passes through the foregoing target tilt-shift point O. The user can control a direction of the straight line m by means of a slide, virtual adjustment buttons such as a knob, or an input box provided on the display, so that the straight line m passes through other photographed objects on the picture that need to be tilt-shifted.

Figure 5:
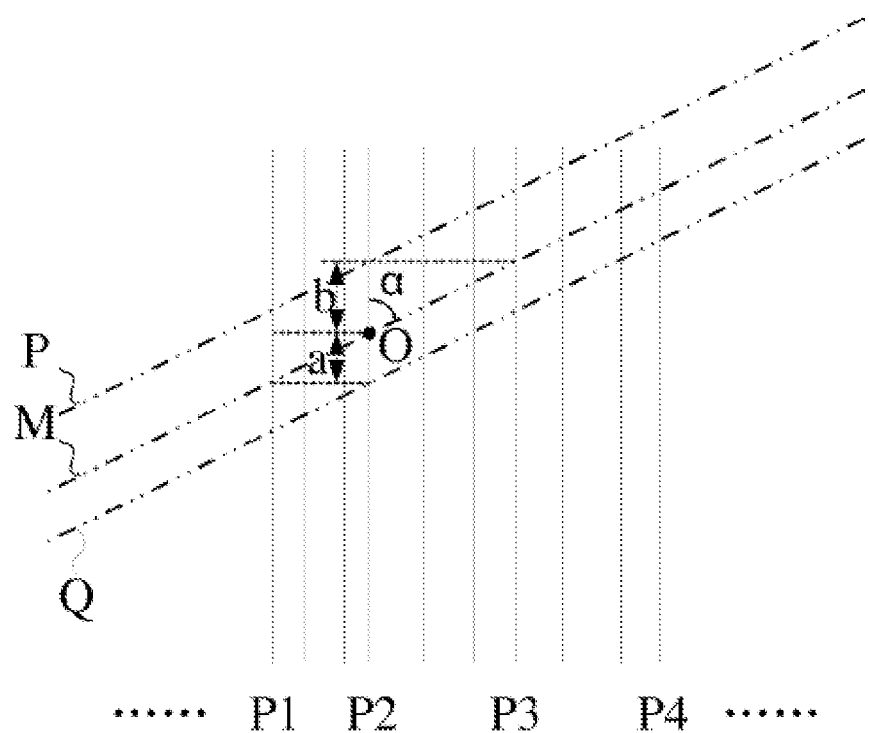
FIG. 5 is a schematic diagram of tilt-shift parameters according to an embodiment of the present invention.

If the tree and the person are also needed to produce a silt-shift effect, the straight line m needs to be controlled to pass through both the tree and the person, and in this case, a tilt-shift inclination of the straight line m input by the user needs to be received. The straight line m formed by connecting the car, the tree, and the person is the tilt-shift axis, and the target focal plane M is a plane at which the straight line m is located. The target focal plane M is determined based on information input by the user, and is an imaginary focal plane and different from a focal plane corresponding to the focus of the camera lens. The reference image P2 has an imaging plane parallel to the sensor on a side of a lens close to the sensor. Because the imaging plane is parallel to the image P2, the imaging plane is not shown separately. As shown in FIG. 5, the tilt-shift inclination is the included angle α between the target focal plane M at which the target tilt-shift point O is located and the imaging plane of the reference image P2. There is a one-to-one correspondence between the included angle α and included angles of the straight line m in different directions in FIG. 4. An input of the included angle α can be completed when the user operates and controls the azimuth of the straight line m on the display screen.

The tilt-shift azimuth of the target focal plane can therefore be determined based on the target tilt-shift point and the tilt-shift inclination.

Sub-step 2. Determine, based on the tilt-shift azimuth and the depth-of-field width, the to-be-composited image(s) in intersection with the target focal plane.

The tilt-shift effect is to blur areas other than the tilt-shift area in the image, and can conversely be regarded as a sharpening of the tilt-shift area. Accordingly, it is also necessary to know width range(s) to be processed on one or two sides of the tilt-shift axis m, or alternatively, a width of the area at which the tilt-shift effect is located, that is, at least one of parameters a or b as shown in FIG. 4. From the foregoing content, it is easy to understand that a tilt-shift boundary straight line p corresponds to an imaginary focal plane P, and a tilt-shift boundary straight line q corresponds to an imaginary focal plane Q. It should be noted that a and b can be input by the user through the input box or determined by the user sliding a virtual slider.

With the determined tilt-shift azimuth of the target focal plane in combination with the depth-of-field width, it is easy to calculate a tilt-shift area range to be processed. The tilt-shift area range is illustrated as a strip between the straight line p and the straight line q in FIG. 4 and as a spatial area between the plane P and the plane Q in FIG. 5.

As illustrated in FIG. 5, the target focal plane M is in intersection with the N images in the tilt-shift area, and the intersection means that there are photographed objects on which tilt-shift processing needs to be processed in corresponding images, so that these images in intersection with the target focal plane can be determined as to-be-composited images that subsequently participate in composite.

It should be noted that the to-be-composited image(s) in intersection with the target focal plane include at least one of a first to-be-composited image or a second to-be-composited image, where the first to-be-composited image is an image with a focal length less than a reference distance in the N images, the second to-be-composited image is an image with a focal length greater than the reference distance in the N images, and the reference distance is a focal length of the reference image.

Taking the illustration in FIG. 5 as an example, the focal length of the reference image P2, which is the reference distance, is $l_2$, the focal length of the reference image P1 is $l_1$, the focal length of the reference image P3 is $l_3$, and the focal length of the reference image P4 is $l_4$, where $l_1 > l_2 > l_3 > l_4$. A method for filtering out to-be composite images P1 and P3 is as follows:

Based on the tilt-shift inclination a input by the user and the depth-of-field widths a and b, it is easy to calculate a focal length corresponding to a to-be-composited image as $l_{pending}=l_2-a*\tan\alpha$, and $l'_{pending}=l_2$ $b*\tan\alpha$, where $l_{pending}<l_2$, and $l'_{pending}>l_2$. It can be understood that either a or b can be zero, but both a and b cannot be zero. An image with a focal length between $l_{pending}$ and $l_2$ is the first to-be-composited image, and an image with a focal length between $l_2$ and $l'_{pending}$ is the second to-be-composited image.

By receiving the parameters such as the target tilt-shift point, tilt-shift inclination, and depth-of-field width, which object in the image that the user wants to perform tilt-shift processing on and a tilt-shift processing range can be determined, and the to-be-composited image(s) are specifically determined.

Step 105. Perform, based on focal lengths of the to-be-composited image(s) and the reference image, image composite on the N images to output a target tilt-shift image.

A picture presented on the reference image is a picture where the target tilt-shift object appears sharp, the to-be-composited image(s) include other photographed objects that require tilt-shift processing, and the focal lengths of different images are different. Therefore, with compositing based on the focal lengths of the images, a blur or sharpening range can be determined by considering distances of different in-focus subjects in combination, so that the miniature model effect of the tilt-shift image is more realistic and natural.

Specifically, the image compositing process in step 105 may be implemented in sub-step 1 or sub-step 2 below.

Sub-step 1. In a case that in-focus subject(s) of the to-be-composited image(s) intersect the target focal plane, stack and composite the to-be-composited image(s) and the reference image.

Each of the plurality of obtained to-be-composited images is determined based on an intersection relationship between the images and the target focal plane. However, the location at which the to-be-composited image intersects the target focal plane is not necessarily the area at which the in-focus subject is located, which means that the intersecting location is not necessarily a sharp picture.

Therefore, when the in-focus subject(s) of the to-be-composited image(s) intersect the target focal plane, it can be learned that the area intersecting the target focal plane in each image is sharp and meets the requirements of the tilt-shift effect. The in-focus subject(s) can be cut out by using a matting algorithm and stacked and composited with the reference image. During the compositing, the tilt-shift area can be linearly processed based on the focal lengths. For example, the reference focal length is $l_2$, the focal length of the in-focus subject that is closest to the lens is $l_1$, with a sharpness of sls, and the focal length of the in-focus subject that is farthest to the lens is $l_3$, with a sharpness of sle, so that a sharpness of the tilt-shift area can be adjusted as $sls-(l_3-l_2)(sls-sle)/(l_3-l_1)$. It should be noted that a higher sharpness gives a sharper image, and a lower sharpness gives a blurrier image. Sharpness can be adjusted up or down.

Sub-step 2. In a case that the in-focus subject(s) of the to-be-composited image(s) do not intersect the target focal plane, perform, based on image(s) of the N images in which in-focus subject(s) intersect with the target focal plane, sharpness processing on the in-focus subject(s) of the to-be-composited image(s), and stack and composite the to-be-composited image(s) and the reference image.

When the in-focus subject(s) of the to-be-composited image(s) do not intersect the target focal plane, it can be learned that the area intersecting the target focal plane in each image is blurred and cannot meet the requirements of the tilt-shift effect. A degree of sharpness may be determined based on images adjacent to the image that does not satisfy the tilt-shift effect. For example, the reference focal length is $l_2$, the focal length of the in-focus subject that is closest to the lens is $l_1$, with a sharpness of sls, and the focal length of the in-focus subject that is farthest to the lens is $l_3$, with a sharpness of sle. When there are to-be-composited image (s) with blurred in-focus subject(s) between the image P1 and the image P2 or between the image P2 and the image P3, sharpness(s) of the tilt-shift area(s) of the to-be-composited image(s) with blurred in-focus subject(s) can be adjusted as $sls-(l_3-l_2)(sls-sle)/(l_3-l_1)$ with reference to the sharpnesses of image P1 and image P3.

Specifically, for the image composite in sub-step 1 or sub-step 2, reference may be made to the composite method below:

A. Cut out the in-focus subject(s) from the to-be-composited image(s) and set the in-focus subject(s) as a foreground layer.

For the filtered-out to-be-composited image, it is required to use a picture of its in-focus subject area. Therefore, mature algorithms such as Bayesian matting algorithm can be used to cut out the in-focus subject from the to-be-composited image. A common understanding may be that in each to-be-composited image after matting processing, areas other than the in-focus subject are transparent areas. It can be understood that when there are a plurality of to-be-composited images, a plurality of in-focus subjects need to be cut out. Correspondingly, all in-focus subjects are used as foreground layers to make up picture elements in the tilt-shift area.

B. Set the reference image as a background layer.

It should be noted that the reference image is an image selected by the user in an early stage of image processing. A distribution of a sharp area and a blurred area of the image meets use requirements. Therefore, the reference image is directly set as the background layer.

C. Stack and composite the foreground layer and the background layer.

Because each image is photographed at the same location, alignment of picture elements during compositing can be ensured. Therefore, after the foreground layer and the background layer are stacked and composited, the in-focus subject of the to-be-composited image that has been cut out covers the same photographed subject in the reference image. In this way, finally, a simulated tilt-shift image with a striped area in the picture can be obtained.

In the embodiments of the present invention, the reference image and the to-be-composited image(s) are separately determined from a group of N images with different in-focus subjects. The reference image is an image with a sharp target tilt-shift object, that is, an image corresponding to a photographed object that needs to remain sharp in the tilt-shift effect. The to-be-composited image(s) are other image(s) that are determined, based on the target tilt-shift point, the tilt-shift inclination, and the depth-of-field width, intersecting the target focal plane. As a result, the reference image and the to-be-composited image(s) separately record focal length information of the different in-focus subjects. The distance information can reflect a spatial location relationship of the different in-focus subjects in an image picture. Composite processing based on the focal lengths of the to-be-composited image(s) and the reference image can make a transition between a sharp area and a blurred area in the composited tilt-shift image more natural and smooth, which can simulate a tilt-shift effect more naturally and make a miniature model effect more realistic. In addition, in the tilt-shift image, images of different photographed objects before and after the target tilt-shift object are used as to-be-composited images, making full use of the focal lengths to improve reality of the tilt-shift effect. Furthermore, using a plurality of sorted images for image processing also helps improve image processing efficiency.

Figure 6:
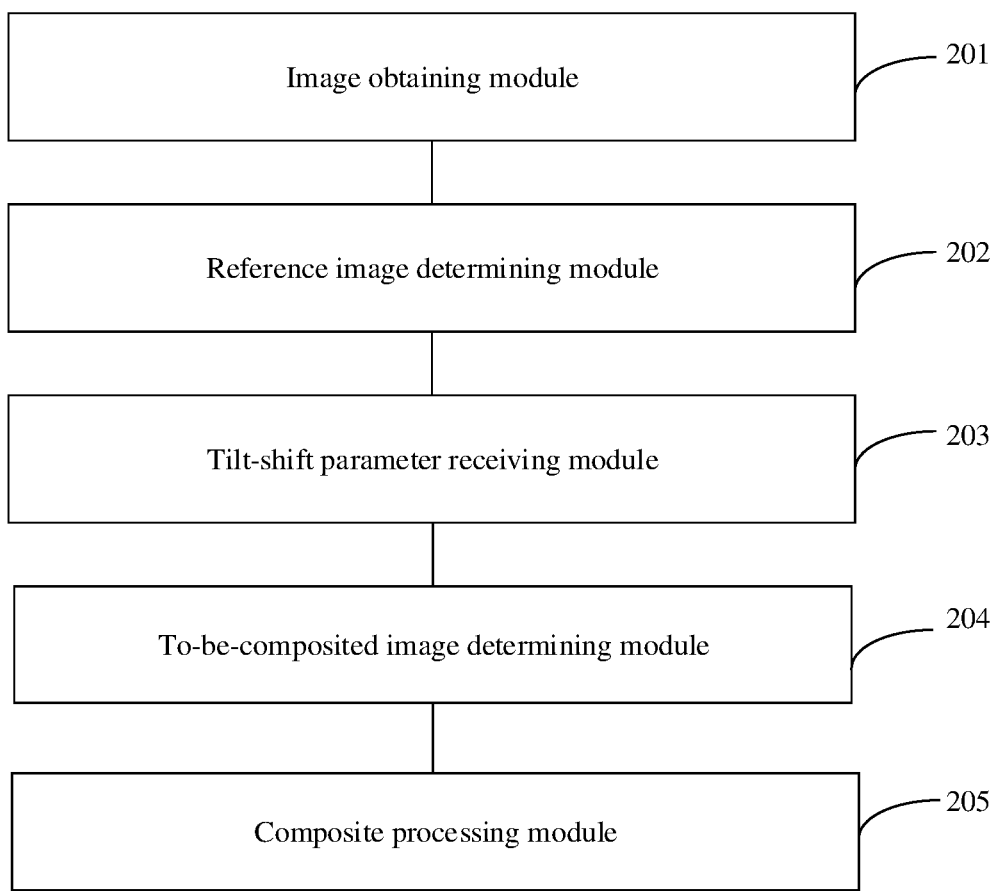
FIG. 6 is a schematic structural diagram of an electronic device according to an embodiment of the present invention.

FIG. 6 is a block diagram of an electronic device. The electronic device includes the following modules.

An image obtaining module 201 is configured to obtain N images, where the N images are formed based on a same photographing location and have different in-focus subjects, and the different in-focus subjects correspond to different focal lengths.

A reference image determining module 202 is configured to determine a reference image in the N images, where the reference image is an image in which a target tilt-shift object has a sharpness greater than a preset threshold.

A tilt-shift parameter receiving module 203 is configured to obtain tilt-shift parameters input by a user, where the tilt-shift parameters are used to indicate an azimuth of a target focal plane and a tilt-shift area range.

Optionally, the tilt-shift parameters include a target tilt-shift point, a tilt-shift inclination, and a depth-of-field width. The target tilt-shift point is a coordinate location at which the target tilt-shift object is located; the tilt-shift inclination is an included angle between the target focal plane at which the target tilt-shift point is located and an imaging plane of the reference image, the target focal plane being a plane at which a tilt-shift axis formed by connecting photographed objects is located; and the depth-of-field width is a width of an area with a tilt-shift effect.

A to-be-composited image determining module 204 is configured to determine, based on the tilt-shift parameters, to-be-composited image(s) in intersection with the target focal plane.

Optionally, when the tilt-shift parameters include a target tilt-shift point, a tilt-shift inclination, and a depth-of-field width, the to-be-composited image determining module 204 may include:
an azimuth determining sub-module, configured to determine, based on the target tilt-shift point and the tilt-shift inclination, a tilt-shift azimuth of the target focal plane; and
an image determining sub-module, configured to determine, based on the tilt-shift azimuth and the depth-of-field width, the to-be-composited image(s) in intersection with the target focal plane.

Optionally, the to-be-composited image(s) include at least one of a first to-be-composited image or a second to-be-composited image, where the first to-be-composited image is an image with a focal length less than a reference distance in the N images, the second to-be-composited image is an image with a focal length greater than the reference distance in the N images, and the reference distance is a focal length of the reference image.

A composite processing module 205 is configured to perform, based on focal lengths of the to-be-composited image(s) and the reference image, composite processing on the N images to output a target tilt-shift image.

Optionally, the composite processing module 205 may include:
a first composite processing sub-module, configured to: in a case that in-focus subject(s) of the to-be-composited image(s) intersect the target focal plane, stack and composite the to-be-composited image(s) and the reference image; and a second composite processing sub-module, configured to: in a case that the in-focus subject(s) of the to-be-composited image(s) do not intersect the target focal plane, perform, based on image(s) of the N images in which in-focus subject(s) intersect with the target focal plane, sharpness processing on the in-focus subject(s) of the to-be-composited image(s), and stack and composite the to-be-composited image(s) and the reference image.

Optionally, the first composite processing sub-module or the second composite processing sub-module may include:
a foreground setting unit, configured to cut out the in-focus subject(s) from the to-be-composited image(s) and set the in-focus subject(s) as a foreground layer;
a background setting unit, configured to set the reference image as a background layer; and
a stacking and compositing unit, configured to stack and composite the foreground layer and the background layer.

The electronic device embodiment is essentially similar to the method embodiment, and therefore is described briefly. For related information and beneficial effects, refer to descriptions of the related parts in the method embodiment.

An embodiment of the present invention further provides an electronic device, including:
a processor, a memory, and a computer program stored in the memory and capable of running on the processor, where when the computer program is executed by the processor, the steps of the image processing method provided in the foregoing embodiments are implemented. The electronic device provided in the embodiments of the present invention is capable of implementing processes that are implemented by the electronic device in the method embodiments of FIG. 1 to FIG. 5. To avoid repetition, details are not described herein again.

Figure 7:
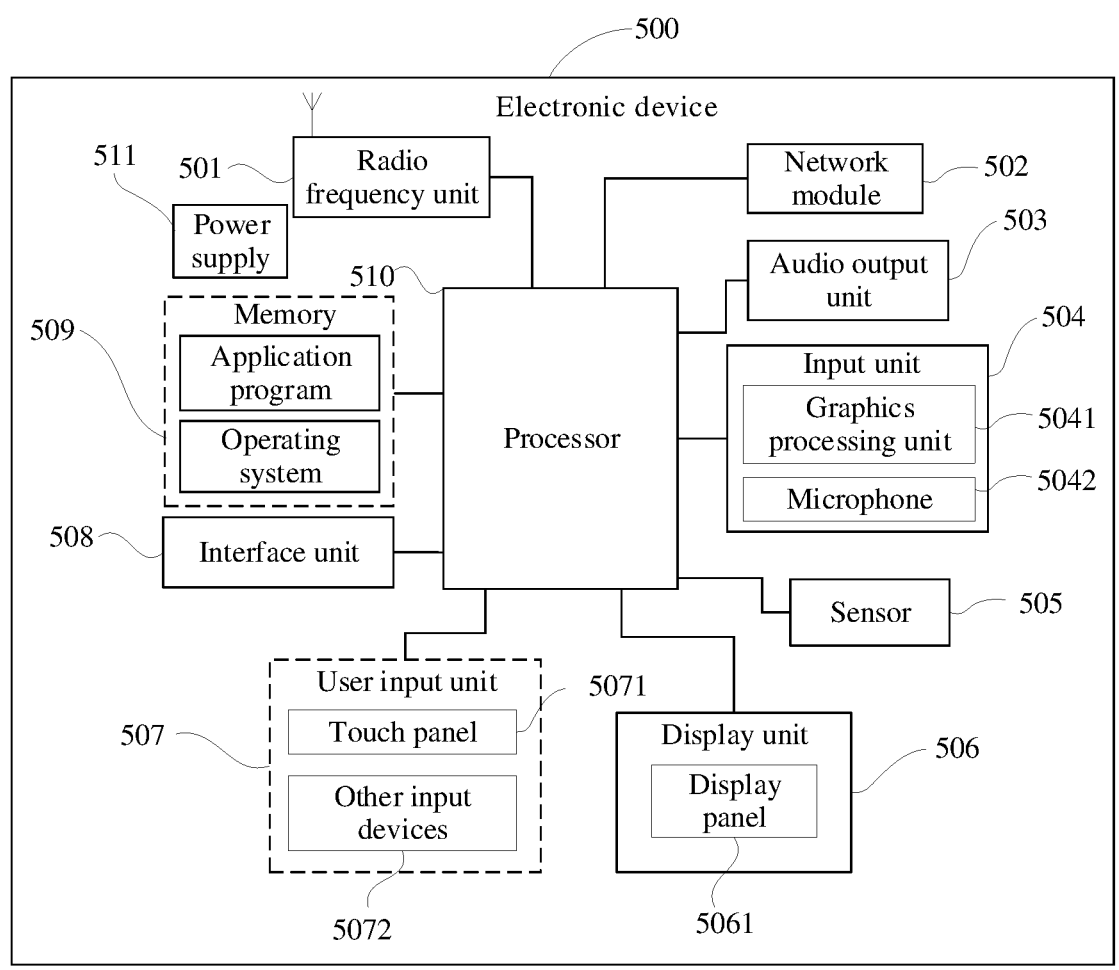
FIG. 7 is a schematic structural diagram of an electronic device according to an embodiment of the present invention.

FIG. 7 is a schematic diagram of a hardware structure of an electronic device for implementing the embodiments of the present invention.

The electronic device 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that a structure of the electronic device shown in FIG. 7 constitutes no limitation to the electronic device, and the electronic device may include components more or fewer than those shown in the figure, or combine some of the components, or arrange the components differently. In this embodiment of the present invention, the electronic device includes but is not limited to a mobile phone, a tablet computer, a notebook computer, a palmtop computer, a vehicle-mounted terminal, a wearable device, a pedometer, or the like.

The processor 510 is configured to: obtain N images, where the N images are taken based on a same photographing location and have different in-focus subjects, and the different in-focus subjects correspond to different focal lengths;
determine a reference image in the N images, where the reference image is an image in which a target tilt-shift object has a sharpness greater than a preset threshold;
obtain tilt-shift parameters input by a user, where the tilt-shift parameters are used to indicate an azimuth of a target focal plane and a tilt-shift area range;

determine, based on the tilt-shift parameters, to-be-composited image(s) in intersection with the target focal plane; and perform, based on focal lengths of the to-be-composited image(s) and the reference image, image composite on the N images to output a target tilt-shift image.

In the embodiments of the present invention, the reference image and the to-be-composited image(s) are separately determined from a group of N images with different in-focus subjects. The reference image is an image with a sharp target tilt-shift object, that is, an image corresponding to a photographed object that needs to remain sharp in the tilt-shift effect. The to-be-composited image(s) are other image(s) that are determined, based on the target tilt-shift point, the tilt-shift inclination, and the depth-of-field width, intersecting the target focal plane. As a result, the reference image and the to-be-composited image(s) separately record focal length information of the different in-focus subjects. The distance information can reflect a spatial location relationship of the different in-focus subjects in an image picture. Composite processing based on the focal lengths of the to-be-composited image(s) and the reference image can make a transition between a sharp area and a blurred area in the composited tilt-shift image more natural and smooth, which can simulate a tilt-shift effect more naturally and make a miniature model effect more realistic.

It should be understood that in this embodiment of the present invention, the radio frequency unit 501 may be configured to receive and transmit signals in an information reception or transmission or call process. Specifically, after receiving downlink data from a base station, the radio frequency unit 501 transmits the downlink data to the processor 510 for processing, and in addition, transmits uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may further communicate with a network and other devices via a wireless communications system.

The electronic device provides wireless broadband Internet access for a user by using the network module 502, for example, helping the user transmit and receive e-mails, browse web pages, and access streaming media.

The audio output unit 503 may convert audio data into an audio signal, and output the audio signal as sound, where the audio data is received by the radio frequency unit 501 or the network module 502, or stored in the memory 509. In addition, the audio output unit 503 may further provide audio output (for example, a call signal received sound or a message received sound) related to a specific function performed by the electronic device 500. The audio output unit 503 includes a speaker, a buzzer, a receiver, and the like.

The input unit 504 is configured to receive an audio signal or a video signal. The input unit 504 may include a graphics processing unit (Graphics Processing Unit, GPU) 5041 and a microphone 5042. The graphics processing unit 5041 processes image data of a static picture or a video captured by an image capture apparatus (for example, a camera) in an image capture mode or a video capture mode. A processed image frame may be displayed on the display unit 506. The image frame processed by the graphics processing unit 5041 may be stored in the memory 509 (or another storage medium) or transmitted by using the radio frequency unit 501 or the network module 502. The microphone 5042 can receive sounds and process such sounds into audio data. The processed audio data can be converted into a format output that can be transmitted to a mobile communication base station through the radio frequency unit 501 in a telephone call mode.

The electronic device 500 further includes at least one sensor 505, for example, an optical sensor, a motion sensor, and other sensors. Specifically, the optical sensor includes an ambient light sensor and a proximity sensor. The ambient light sensor may adjust brightness of a display panel 5061 based on intensity of ambient light. When the electronic device 500 moves near an ear, the proximity sensor may disable the display panel 5061 and/or backlight. As a type of motion sensor, an accelerometer sensor can detect magnitudes of accelerations in all directions (usually three axes), can detect the magnitude and direction of gravity when the electronic device is in a static state, and can be applied to electronic device posture recognition (such as screen switching between portrait and landscape, related games, and magnetometer posture calibration), functions related to vibration recognition (such as pedometer and tapping), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by the user or information provided for the user. The display unit 506 may include a display panel 5061. The display panel 5061 may be configured in a form of a liquid crystal display (LCD), an organic light-emitting diode (OLED), or the like.

The user input unit 507 may be configured to receive input digit or character information, and generate key signal input that is related to user setting and function control of the electronic device. Specifically, the user input unit 507 includes a touch panel 5071 and other input devices 5072. The touch panel 5071 is also referred to as a touchscreen and can collect a touch operation (such as an operation performed by the user on the touch panel 5071 or near the touch panel 5071 with a finger or by using any proper object or accessory such as a stylus) of the user on or near the touch panel 5071. The touch panel 5071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touch point coordinates, transmits the touch point coordinates to the processor 510, and receives and executes a command transmitted by the processor 510. In addition, the touch panel 5071 may be implemented in a plurality of forms, for example, as a resistive, capacitive, infrared, or surface acoustic wave touch panel. In addition to the touch panel 5071, the user input unit 507 may further include other input devices 5072. Specifically, the other input devices 5072 may include but are not limited to a physical keyboard, a function key (such as a volume control key or a switch key), a trackball, a mouse, and a joystick. Details are not described herein.

Further, the touch panel 5071 may cover the display panel 5061. After the touch panel 5071 detects a touch operation on or near the touch panel 5071, the touch panel 5071 transmits the touch operation to the processor 510 to determine a type of a touch event. Then the processor 510 provides a corresponding visual output on the display panel 5061 based on the type of the touch event. In FIG. 7, the touch panel 5071 and the display panel 5061 serve as two separate components to implement input and output functions of the electronic device. However, in some embodiments, the touch panel 5071 and the display panel 5061 may be integrated to implement the input and output functions of the electronic device. This is not specifically limited herein.

The interface unit 508 is an interface for connecting an external apparatus to the electronic device 500. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 508 may be configured to receive an input (for example, data information or power) from an external apparatus and transmit the received input to one or more elements within the electronic device 500, or may be configured to transmit data between the electronic device 500 and the external apparatus.

The memory 509 may be configured to store software programs and various data. The memory 509 may mainly include a program storage area and a data storage area. The program storage area may store an operating system, an application program required by at least one function (for example, an audio play function or an image play function), and the like. The data storage area may store data (for example, audio data and a phone book) created based on usage of the electronic device. In addition, the memory 509 may include a high-speed random access memory, and may further include a non-volatile memory such as a disk storage device, a flash memory device, or another volatile solid-state storage device.

The processor 510 is a control center of the electronic device, uses various interfaces and lines to connect all parts of the entire electronic device, and performs various functions and data processing of the electronic device by running or executing the software program and/or module stored in the memory 509 and invoking data stored in the memory 509, thereby performing overall monitoring on the electronic device. The processor 510 may include one or more processing units. Preferably, the processor 510 may integrate an application processor and a modem processor. The application processor mainly processes the operating system, a user interface, an application program, and the like. The modem processor mainly processes wireless communication. It may be understood that the modem processor may alternatively not be integrated in the processor 510.

The electronic device 500 may further include the power supply 511 (such as a battery) that supplies power to the components. Preferably, the power supply 511 may be logically connected to the processor 510 via a power management system, so that functions such as charge and discharge management and power consumption management are implemented via the power management system.

In addition, the electronic device 500 includes some functional modules that are not illustrated. Details are not described herein.

An embodiment of the present invention further provides a computer-readable storage medium, where a computer program is stored in the computer-readable storage medium. When the computer program is executed by a processor, each process of the foregoing information processing method embodiment is implemented, with the same technical effect achieved. To avoid repetition, details are not described herein again. For example, the computer-readable storage medium is a read-only memory (ROM for short), a random access memory (RAM for short), a magnetic disk, an optical disc, or the like.

It should be noted that the terms "comprise", "include", or any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of the present invention.

The embodiments of the present invention are described above with reference to the accompanying drawings, but the present invention is not limited to the foregoing implementations. The foregoing embodiments are only illustrative rather than restrictive. Inspired by the present invention, a person of ordinary skill in the art can still derive many variations without departing from the essence of the present invention and the protection scope of the claims. All these variations shall fall within the protection of the present invention.

What is claimed is:

1. An image processing method, comprising:
    obtaining N images, wherein the N images are taken based on a same photographing location and have different in-focus subjects, and the different in-focus subjects correspond to different focal lengths;
    determining a reference image in the N images, wherein the reference image is an image in which a target tilt-shift object has a sharpness greater than a preset threshold;
    obtaining tilt-shift parameters input by a user, wherein the tilt-shift parameters are used to indicate an azimuth of a target focal plane and a tilt-shift area range;
    determining, based on the tilt-shift parameters, to-be-composited image(s) in intersection with the target focal plane; and
    performing, based on focal lengths of the to-be-composited image(s) and the reference image, image composite on the N images to output a target tilt-shift image.

2. The method according to claim 1, wherein
    the tilt-shift parameters comprise a target tilt-shift point, a tilt-shift inclination, and a depth-of-field width; wherein
    the target tilt-shift point is a coordinate location at which the target tilt-shift object is located; the tilt-shift inclination is an included angle between the target focal plane at which the target tilt-shift point is located and an imaging plane of the reference image, the target focal plane being a plane at which a tilt-shift axis formed by connecting photographed objects is located; and the depth-of-field width is a width of an area with a tilt-shift effect.

3. The method according to claim 2, wherein the determining, based on the tilt-shift parameters, to-be-composited image(s) in intersection with the target focal plane comprises:

determining, based on the target tilt-shift point and the tilt-shift inclination, a tilt-shift azimuth of the target focal plane; and determining, based on the tilt-shift azimuth and the depth-of-field width, the to-be-composited image(s) in intersection with the target focal plane.

4. The method according to claim 1, wherein the to-be-composited image(s) comprise at least one of a first to-be-composited image or a second to-be-composited image, wherein the first to-be-composited image is an image with a focal length less than a reference distance in the N images, the second to-be-composited image is an image with a focal length greater than the reference distance in the N images, and the reference distance is a focal length of the reference image.

5. The method according to claim 1, wherein the performing, based on focal lengths of the to-be-composited image(s) and the reference image, image composite on the N images to output a target tilt-shift image comprises:

in a case that in-focus subject(s) of the to-be-composited image(s) intersect the target focal plane, stacking and compositing the to-be-composited image(s) and the reference image; and in a case that the in-focus subject(s) of the to-be-composited image(s) do not intersect the target focal plane, performing, based on image(s) of the N images in which in-focus subject(s) intersect with the target focal plane, sharpness processing on the in-focus subject(s) of the to-be-composited image(s), and stacking and compositing the to-be-composited image(s) and the reference image.

6. The method according to claim 5, wherein the stacking and compositing the to-be-composited image(s) and the reference image comprises:

cutting out the in-focus subject(s) from the to-be-composited image(s) and setting the in-focus subject(s) as a foreground layer;

setting the reference image as a background layer; and stacking and compositing the foreground layer and the background layer.

7. The method according to claim 1, wherein the obtaining N images comprises:

performing a photographing operation on each of N different in-focus subjects to obtain N images; and storing the N images.

8. The method according to claim 1, wherein the obtaining N images comprises:

accessing a target device through a removable storage medium or wirelessly; and obtaining N images prestored by the target device.

9. The method according to claim 7, wherein the storing the N images comprises:

determining a focal length of each of the N different in-focus subjects with respect to a camera;

sorting the N images in order of their focal lengths; and storing the sorted N images.

10. The method according to claim 1, wherein the determining a reference image in the N images comprises:

receiving object location information of the target tilt-shift object input by the user, wherein the object location information comprises a location area at which the target tilt-shift object is located in the N images; and determining the reference image from the N images based on the object location information.

11. The method according to claim 10, wherein the determining the reference image from the N images based on the object location information comprises:

obtaining a sharpness of each of the N images; and determining an image in which the target tilt-shift object has a sharpness greater than the preset threshold as the reference image.

12. An electronic device, comprising a processor, a memory, and a computer program stored in the memory and capable of running on the processor, wherein when the computer program is executed by the processor, the following steps are implemented:

obtaining N images, wherein the N images are taken based on a same photographing location and have different in-focus subjects, and the different in-focus subjects correspond to different focal lengths;

determining a reference image in the N images, wherein the reference image is an image in which a target tilt-shift object has a sharpness greater than a preset threshold;

obtaining tilt-shift parameters input by a user, wherein the tilt-shift parameters are used to indicate an azimuth of a target focal plane and a tilt-shift area range;

determining, based on the tilt-shift parameters, to-be-composited image(s) in intersection with the target focal plane; and performing, based on focal lengths of the to-be-composited image(s) and the reference image, image composite on the N images to output a target tilt-shift image.

13. The electronic device according to claim 12, wherein the tilt-shift parameters comprise a target tilt-shift point, a tilt-shift inclination, and a depth-of-field width; wherein the target tilt-shift point is a coordinate location at which the target tilt-shift object is located; the tilt-shift inclination is an included angle between the target focal plane at which the target tilt-shift point is located and an imaging plane of the reference image, the target focal plane being a plane at which a tilt-shift axis formed by connecting photographed objects is located; and the depth-of-field width is a width of an area with a tilt-shift effect.

14. The electronic device according to claim 13, wherein the step of determining, based on the tilt-shift parameters, to-be-composited image(s) in intersection with the target focal plane comprises:

determining, based on the target tilt-shift point and the tilt-shift inclination, a tilt-shift azimuth of the target focal plane; and determining, based on the tilt-shift azimuth and the depth-of-field width, the to-be-composited image(s) in intersection with the target focal plane.

15. The electronic device according to claim 12, wherein the to-be-composited image(s) comprise at least one of a first to-be-composited image or a second to-be-composited image, wherein the first to-be-composited image is an image with a focal length less than a reference distance in the N images, the second to-be-composited image is an image with a focal length greater than the reference distance in the N images, and the reference distance is a focal length of the reference image.

16. The electronic device according to claim 12, wherein the step of performing, based on focal lengths of the to-be-composited image(s) and the reference image, image composite on the N images to output a target tilt-shift image comprises:

in a case that in-focus subject(s) of the to-be-composited image(s) intersect the target focal plane, stacking and compositing the to-be-composited image(s) and the reference image; and in a case that the in-focus subject(s) of the to-be-composited image(s) do not intersect the target focal plane, performing, based on image(s) of the N images in which in-focus subject(s) intersect with the target focal plane, sharpness processing on the in-focus subject(s) of the to-be-composited image(s), and stacking and compositing the to-be-composited image(s) and the reference image.

17. The electronic device according to claim 12, wherein the step of obtaining N images comprises:

performing a photographing operation on each of N different in-focus subjects to obtain N images; and storing the N images.

18. The electronic device according to claim 12, wherein the step of determining a reference image in the N images comprises:

receiving object location information of the target tilt-shift object input by the user, wherein the object location information comprises a location area at which the target tilt-shift object is located in the N images; and determining the reference image from the N images based on the object location information.

19. The electronic device according to claim 18, wherein the step of determining the reference image from the N images based on the object location information comprises:

obtaining a sharpness of each of the N images; and determining an image in which the target tilt-shift object has a sharpness greater than the preset threshold as the reference image.

20. A non-transitory computer-readable storage medium, wherein the computer-readable storage medium stores a computer program, and when the computer program is executed by a processor, the following steps are implemented:

obtaining N images, wherein the N images are taken based on a same photographing location and have different in-focus subjects, and the different in-focus subjects correspond to different focal lengths;

determining a reference image in the N images, wherein the reference image is an image in which a target tilt-shift object has a sharpness greater than a preset threshold;

obtaining tilt-shift parameters input by a user, wherein the tilt-shift parameters are used to indicate an azimuth of a target focal plane and a tilt-shift area range;

determining, based on the tilt-shift parameters, to-be-composited image(s) in intersection with the target focal plane; and performing, based on focal lengths of the to-be-composited image(s) and the reference image, image composite on the N images to output a target tilt-shift image.

* * * * *